July 30, 1963    F. B. DE PODESTA    3,099,230
COLUMN AND DECK CONSTRUCTION FOR VEHICLE SHIPPING APPARATUS
Filed July 31, 1961
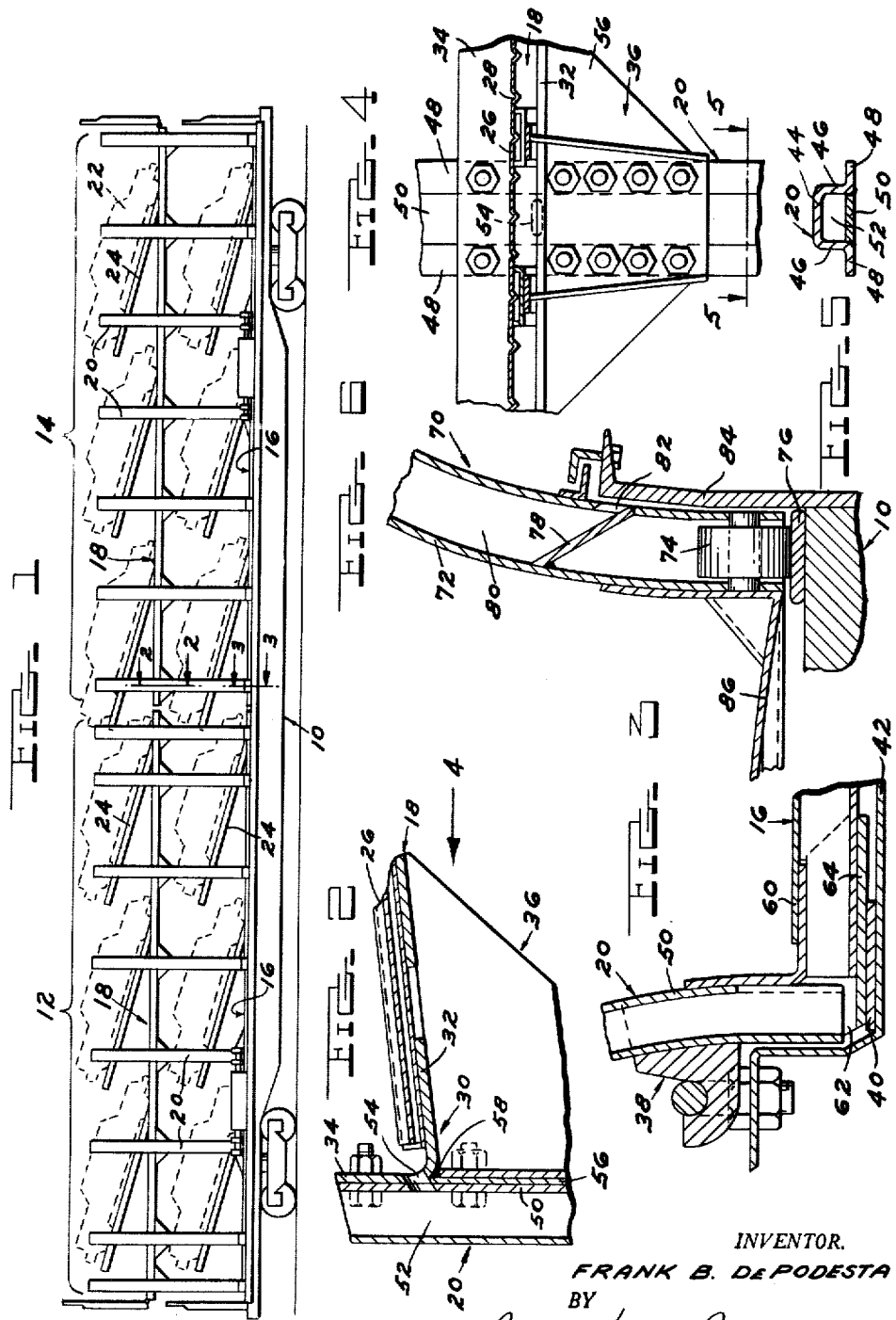
INVENTOR.
FRANK B. DE PODESTA
BY
Barnes, Kisselle, Raisch & Choate
ATTORNEYS

United States Patent Office

3,099,230
Patented July 30, 1963

3,099,230
COLUMN AND DECK CONSTRUCTION FOR
VEHICLE SHIPPING APPARATUS
Frank B. De Podesta, Farmington, Mich., assignor to
Paragon Bridge and Steel Company, Novi, Mich., a
corporation of Michigan
Filed July 31, 1961, Ser. No. 128,159
6 Claims. (Cl. 105—368)

This invention generally relates to the transportation of vehicles and more particularly to a vehicle carrying shipping rack adapted to be mounted on a railway flat car to convert the same for shipment of automotive vehicles.

Multi-level shipping racks of generally open construction are presently employed by many railroads for supporting automobiles on piggy-back type flat cars. In order to increase the load carrying capacity of the flat cars the shipping racks are customarily built with ramps or decks arranged generally one above another in two or three levels, and as a result from one-half to two-thirds of the automobiles loaded in the shipping rack are located below an upper level of automobiles and the supporting framework therefor. Due to the open construction of the shipping rack, which is preferred for reasons of economy, the lower level automobiles are exposed to damage from rain water or melting snow and ice running off the upper decks or framework of the rack. Although rain water itself does not ordinarily damage the vehicles, when it becomes laden with rust, dirt or grease through contact with the deck or superstructure of the rack it often causes spotting or staining of the automobile finish, particularly on newly finished automobiles which comprise the bulk of the automobiles currently transported on such shipping racks.

It is therefore an object of the present invention to provide an improved vehicle shipping rack having a column and deck construction adapted to prevent damage to automobiles located on the lower deck or decks from contaminated rain water or other damaging liquids which collect on the upper decks.

In the accompanying drawings:

FIG. 1 is an elevational view of a railroad flat car having two tandem sections of a bi-level shipping rack assembly of the invention mounted thereon.

FIG. 2 is a fragmentary sectional view taken on the line 2—2 of FIG. 1.

FIG. 3 is a sectional view taken on the line 3—3 of FIG. 1.

FIG. 4 is a fragmentary elevational view of the upper deck and gusset structure looking in the direction of the arrow of FIG. 2.

FIG. 5 is a sectional view taken on the line 5—5 of FIG. 4.

FIG. 6 is a fragmentary sectional view taken in a vertical transverse plane across the shipping rack illustrating a modified form of column construction also in accordance with the present invention.

Referring in more detail to the accompanying drawing, FIG. 1 shows a conventional extra-length piggy-back flat car 10 provided with two substantially identical sections 12 and 14 of a bi-level vehicle shipping rack assembly constructed in accordance with the present invention. Each of the rack sections 12, 14 generally comprises a fixed bottom deck 16 and a fixed upper deck 18 each of which extends horizontally lengthwise of flat car 10 in horizontal alignment with the corresponding deck of the adjacent rack section. Decks 16 and 18 are supported in vertically spaced relation by a series of longitudinally spaced vertical side columns 20. The above shipping rack is adapted to support a total of 12 standard size American automobiles 22 by means of inclined ramps or tracks 24 arranged to accommodate three automobiles on each deck of each section of the rack assembly. Each ramp 24 is pivotably supported by a pair of longitudinally adjacent columns 20 so that the ramps may be swung up against the columns to permit automobiles to be driven along decks 16 and 18 during progressive loading or unloading of the ramps.

Referring to FIGS. 2 and 4, the upper deck 18 is of imperforate construction, preferably being made from a single sheet of metal plate which is formed by a rolling process so as to be bowed upwardly in a transverse arch of uniform radius to form a solid deck plate 26. Prior to the rolling operation a series of transversely extending and longitudinally spaced V-shaped ribs 28 are integrally formed in deck 18 to add stiffness and strength to the deck. After deck plate 26 is corrugated and arched a pair of right angle curb plates 30, comprising a horizontal flange 32 and a vertical flange 34 of heavier section than the deck plate, are joined to the longitudinal side edges of upper deck 18 by welding the horizontal curb flange 32 to the underside of deck plate 26. Curb plates 30 serve as longitudinal supports for upper deck 18 and the vehicles supported thereon as well as side curbs or troughs therefor. It is to be noted that, due to the arch of upper deck 18, the inside corner of curb plate 30 is located at the lowermost elevation of the upper deck structure (FIG. 2). Hence rain water, grease or other liquids which drop onto deck plate 26 will run off to the sides of the deck and collect along the inside corner of curb plate 30.

The upper deck 18 is supported by a gusset structure 36 which is bolted to the inner surface of vertical side columns 20. Each column 20 is in turn supported at its lower end by a cast iron shoe member 38 adapted to slide on a wear plate 30 affixed to the floor 42 of flat car 10. Each column 20 is preferably constructed by pressing flat plate stock into a cross sectional configuration known as a "hat section" (FIG. 5) comprising a center section 44, a pair of parallel side sections 46 which extend perpendicular to the center section 44 and a pair of co-planar rim or flange sections 48 disposed parallel to center section 44. A filler plate 50 is welded between the inner edges of column flanges 48, filler plate 50 running vertically substantially the entire distance between the bottom deck 16 to a point beyond the upper deck 18. Filler plates 50 thereby provide reinforcement for each column 20 and also enclose each column for at least the portion thereof extending between the uppermost deck and the bottom deck.

The hollow space 52 thus formed in the center of each column 20 is utilized in accordance with the present invention to provide a conduit or downspout for the contaminated water or other liquids which are collected in the upper deck curb plate 30. A drainage passage 54 is formed through the inside corner of curb plate 30 which extends outwardly into the enclosed center space 52 of each column 20. Passages 54 may be produced by burning aligned holes through the curb plate 30 and the portion of filler plate 50 adjacent thereto. When the passage 54 is produced in this manner molten metal 58 will flow downwardly and solidify in the space between the outside corner of curb plate 30 and the longitudinal gusset 56 of gusset structure 36 so that there is no leakage when passage 54 is located at the very bottom of the inside corner of curb plate 30.

The outlet for the water conducted downward through each of the downspout columns 20 is preferably located below the elevation of the deck plate 60 of bottom deck 16. As shown in FIG. 3, an outlet opening 62 is formed by spacing the bottom end of column 20 slightly above the bottom plate 64 of column shoe 38, it being understood that the outer vertical side of shoe 38 is open in the bottom half thereof.

With the above upper deck construction 18 and side column construction 20 it will now be understood that the automobiles 22 located beneath upper deck 18 are shielded from water which collects on the upper deck, such water being safely conducted through the closed passage 52 in each of the side columns 20 to a point below deck 16 where it may run harmlessly through the floor of the flat car 10.

Referring to FIG. 6, there is shown a modified form of side column construction comprising a vertical side column 70, which, like column 20, is a hat section formed column with a reinforcing and closing filler plate 72 extending upwardly from the lower end of column 70 to a point above the uppermost deck of the rack assembly. Column 70 differs from column 20 in that a roller 74 is journalled in the enclosed space at the bottom of the column for rolling contact with a wear plate 76 affixed to the floor of flat car 10. A baffle plate 78 is welded diagonally across the water conducting enclosed space 80 in column 70 which serves to direct the water flowing down the column to a side outlet hole 82 located in the outer side of column 70 immediately above the lower edge of baffle plate 78. Thus with this modified arrangement water is drained from downspout column 70 against the side sill 84 of the flat car where it runs down to the floor of the flat car 10 without splashing or otherwise contacting the vehicles located on the lower deck of this roller mounted rack assembly.

I claim:

1. In a device for transporting automotive vehicles the combination comprising means forming a lower deck for supporting automotive vehicles, a plurality of upright columns disposed along each side of said lower deck with at least one of said columns on each side of said deck having weight supporting structural portions arranged to form a hollow enclosed portion providing an upright conduit, a generally imperforate upper deck supported on said columns above said lower deck for supporting automotive vehicles, said upper deck having generally right angular curb portions including an upright flange for re-inforcing said deck, said curb portions forming troughs extending along the side edges of said deck adjacent the inner sides of said columns and having outlet openings therein communicating with the interior of said conduit columns at mutually overlapping portions of said curb portions and said columns for conducting rain water and the like collecting on said upper deck downwardly through said columns, said conduit columns having outlet openings therein adjacent the lower ends thereof.

2. In a device for transporting automotive vehicles the combination comprising upper and lower level support means for supporting automotive vehicles in a bi-level arrangement on said transporting device, a plurality of upright columns spaced along each side of said transporting device for supporting said support means, a generally impeforate member extending transversely between said columns and lengthwise of said transporting device beneath said upper level support means and above the loaded position of the vehicles on said lower level support means, at least one of said columns on each side of said imperforate member having weight supporting structural portions arranged to form generally enclosed upright conduits, said imperforate member having sides adapted to serve as troughs with outlet openings therein communicating with the interior of the conduit columns for conducting rain water and the like collecting on said imperforate member downwardly through said conduit columns, said conduit columns having outlet openings therein positioned so that said rain water is drained from said conduit columns without contacting the vehicles on said lower level support means.

3. A shipping rack for carrying automotive vehicles on a railroad flat car comprising a plurality of upright columns spaced along each side of the railroad car, a vehicle supporting deck extending lengthwise of the railroad car and transversely between said side columns, means including curb members connecting said deck to said side columns so that said columns support said deck at an elevation spaced vertically above the floor structure of the railroad car to permit automotive vehicles to be loaded beneath said deck, said deck comprising an imperforate metal structure plate arched upwardly transversely to the rack and having transverse reinforcing corrugations spaced longitudinally thereof, said curb members being joined to said deck along each longitudinal edge thereof and extending therealong adjacent said side columns, said curb members having drainage openings therein for conducting liquids collected on said deck to the interior of said columns, said side columns each having weight supporting structural portions arranged to form an enclosed passage extending downwardly therethrough from said drainage opening and further having an outlet opening communicating with said enclosed passage for draining said liquids therefrom at a location where the liquids fall clear of the automotive vehicles carried by said shipping rack.

4. The combination set forth in claim 3 wherein said curb member comprises a substantially right angular member of thicker section than said metal plate structure for longitudinally bracing said deck and said rack, said curb member having a flange inclined slightly upwardly to match the upward arch of said metal plate structure and secured to the underside of said deck and a vertical flange extending above the level of the longitudinal side edges of said deck and adjacent said side columns.

5. The combination set forth in claim 3 wherein each of said side columns comprises a metal plate formed to have a hat section cross sectional contour comprising an outer center plate, a pair of spaced parallel side plates joined to said center plate and extending perpendicularly from the inner surface thereof and a pair of co-planar flanges joined to the inner vertical edges of said side plates and extending away from one another parallel with said outer center plate of said column, each of said columns having a reinforcing filler plate extending between said plates thereof to enclose the space between said outer plate and said filler plate of said column to thereby provide said enclosed drainage passage of said column.

6. The combination set forth in claim 5 wherein the bottom end of at least one of said side columns has a roller journalled therein adapted to extend therebelow for rolling contact with the floor structure of said flat car, said column having a baffle plate disposed within the hollow interior thereof closing off the lower end of said enclosed drainage passage above said roller, said column having an outlet hole therethrough located adjacent the upper surface of said baffle plate for draining water from the lower end of said enclosed drainage passage of said column.

References Cited in the file of this patent
UNITED STATES PATENTS

| | | |
|---|---|---|
| 870,917 | Weston | Nov. 12, 1907 |
| 2,433,677 | Thomas | Dec. 30, 1947 |

UNITED STATES PATENT OFFICE
CERTIFICATE OF CORRECTION

Patent No. 3,099,230                      July 30, 1963

Frank B. De Podesta

It is hereby certified that error appears in the above numbered patent requiring correction and that the said Letters Patent should read as corrected below.

Column 4, line 15, for "structural plate" read -- plate structure --.

Signed and sealed this 11th day of February 1964.

(SEAL)
Attest:

ERNEST W. SWIDER
Attesting Officer

EDWIN L. REYNOLDS
Acting Commissioner of Patents